Oct. 29, 1940.   W. R. MATHENY   2,219,931
RETAINER FOR ELECTRICAL CONNECTORS
Filed Dec. 12, 1938
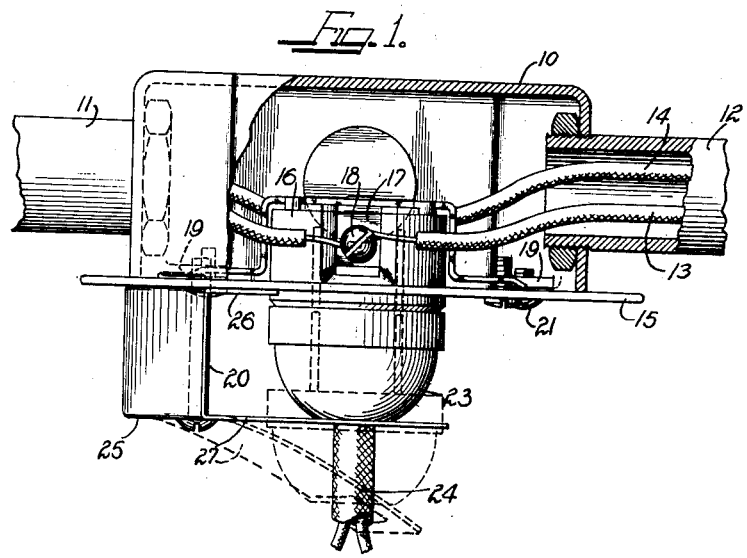
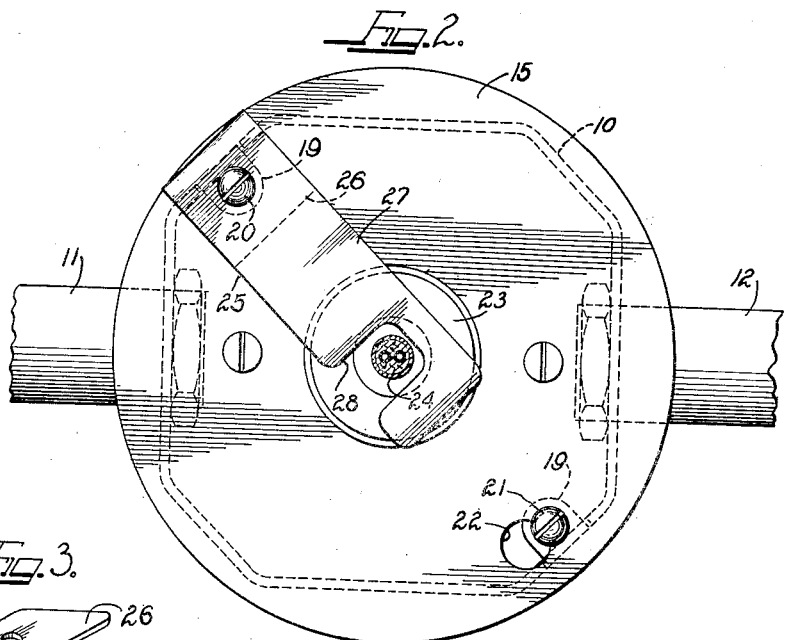
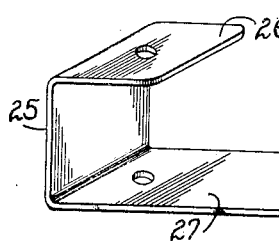
Inventor
WILLARD R. MATHENY Patented Oct. 29, 1940

2,219,931

UNITED STATES PATENT OFFICE 2,219,931

RETAINER FOR ELECTRICAL CONNECTORS

Willard R. Matheny, Chicago, Ill.

Application December 12, 1938, Serial No. 245,064

1 Claim. (Cl. 174—54)

The present invention relates in general to electrical connectors used in electrical wiring systems, particularly the "plug and receptacle" type of connector, and is more specifically concerned with improved means for retaining the plug in connected relation with the receptacle.

The invention is especially advantageous when utilized in conduit wiring systems for the lighting of industrial plants and the like. For example, when it is desired to light a line of industrial machines or benches, it is the present practice to run a conduit along the ceiling over the machines or benches and provide an outlet box wherever a pendant light is desired. A cover for the box is used having a hole through which the upper end of the drop cord is run. The upper end of the cord is usually soldered to the circuit conductors within the box, and the lower end of the cord is fitted with a socket or receptacle, with or without a reflector.

The foregoing arrangement has been objectionable for many reasons, and it has been found that there results an abnormally large number of failures in the lighting service due to its use. The sockets, especially those of the pull-chain type are continually giving trouble. In this case, the services of a maintenance electrician are required and the entire circuit must be shut down while replacing the sockets. As a result lights on the circuit will be out of service and the men or machines at these positions are rendered nonproductive, while the defective light is being repaired.

In many instances, minor accidents occur which pull the drop cord out of the box and cause it to become disconnected from the main circuit, or the receptacle might be pulled loose from the lower end of the drop cord. Similar interruptions occur under these circumstances.

In its broad concept, the present invention contemplates an outlet box cover having a receptacle which may be connected to the main circuit, when the lighting line is being installed, without the necessity of soldering or cutting the wires at each box. Connection may be accomplished merely by baring the wires without cutting them and connecting them to the terminals of the receptacle. The drop cord is then provided with a plug at its uppermost end, which may easily be plugged into the receptacle. In order to prevent withdrawal of the plug from its connected position with the receptacle, due to the inherent weight of the drop cord and connected parts, I provide a retainer which will keep the plug connected under normal conditions, but which will release the plug in the event abnormal forces are applied to the drop cord.

It is an object of the present invention to provide improved means for removably connecting a drop cord into a wiring system.

A further object of the invention is to provide improved means for retaining a connection plug, which is simple of construction, economical to produce and which may readily be attached to a fixture or outlet box.

Another object is to provide an improved device of the herein described character which will release the plug and enable it to disconnect, whenever abnormal pulling pressure is applied to the associated cord.

Still another object is to provide an improved drop cord connection arrangement which will enable the drop cord to be made up as a standard unit and installed in connection with the wiring system or removed therefrom by an ordinary workman without requiring the services of an electrician.

Other objects and features of the invention will more fully appear from the following detailed description, taken in connection with the accompanying drawing, which illustrates a preferred embodiment thereof, and in which:

Figure 1 is an elevational view of an outlet box of a conduit wiring system having the present invention applied thereto;

Figure 2 is a plan view of the same looking toward the exposed surface of the box cover; and Figure 3 is an isometric view showing in detail the construction of the retainer member.

As shown on the drawing:

In the illustrated embodiment of the invention, the invention is disclosed as being applied to an outlet box 10 of usual construction, this box being provided with knockout portions to provide suitable apertures for receiving the ends of conduits 11 and 12 for carrying the main electric circuit as represented by the two conductors 13 and 14.

With this type of system, when it was desired to install a pendant or drop light, the box was provided with a cover plate having a central hole or opening for receiving the upper end of the drop cord therethrough. This end of the cord was necessarily soldered to the circuit conductors within the box and the lower end (not shown) would be fitted with a socket or receptacle, either with or without a reflector.

In order to overcome the disadvantages of such an arrangement and obviate service interruptions due to the failures which inherently occur in such arrangements, there is provided in the present instance a box cover 15 which is fitted at its center with a receptacle connector 16 of usual construction.

This connector is provided with terminal connections as shown at 17 which include a terminal connector screw 18 that enables the receptacle to be connected into the main line circuit simply by baring adjacent portions of the circuit wires and connecting these bared portions to the terminal connections of the receptacle. Thus, the usual soldering during installation is eliminated, and it has been found that the costs of the receptacle arrangement are not over the costs of installing the drop light where soldered connections are made.

The box is provided on its open side with inwardly extending lugs 19—19 which are adapted to receive securing screws 20 and 21. In the usual arrangement, these screws are comparatively short and the screw 20 is arranged to extend through an aperture in the cover of such size as to closely conform to the size of the screw, whereas the opening in the cover for the screw 21 is usually a key slot such as shown at 22.

As shown in Figure 1, the receptacle 16 is adapted to receive in connected relation a suitable plug connector 23 which may be associated with the uppermost end of the drop cord as shown at 24, this drop cord forming the circuit connection for a pendant light arranged at the lowermost end of the cord.

In utilizing a plug connector at the upper end of the cord, it will be apparent that the weight of the drop cord unit may be sufficient to separate the plug from its associated receptacle and thus open the circuit of the light.

In order to obviate such a condition, I have provided a J-shaped member 25 which is disposed with its short leg 26 in engagement with the exposed surface of the plate 15. The longer leg 27 is of sufficient length to extend over the surface of the plug 23.

The legs of the member are apertured adjacent their bridging connection to receive the screw 20 therethrough, the screw in this instance being provided of sufficient length to extend through the cover and also serve to mount the cover in secured position. In addition, the screw 20 forms a pivot for the member so that it may be laterally swung with its leg portions moving parallel to the plane of the cover member 15.

Adjacent its outermost end, the leg 27 is provided with an edge opening slot 28 arranged to receive the cord 24 laterally therein when the member is in plug retaining position. It will be apparent that by merely swinging the member to one side, the plug is released and may be withdrawn from the associated socket whenever desired. However, under normal operation conditions, the member will be in retaining position as shown in Figures 1 and 2 of the drawing.

The retaining member may be constructed of any suitable material, but is preferably constructed from a metal strap of such weight and gauge that the leg 27 will bend adjacent the aperture therein for the screw 20, whenever an abnormal force tending to separate the plug from the receptacle is applied to the drop cord. In practice it has been found desirable to provide for this bending to take place whenever the applied force is substantially more than two to three times the combined weight of the plug, cord, receptacle, reflector and other parts connected thereto.

Bending of the leg 27 due to abnormal forces enables the plug to move to disconnected position, as shown in dotted lines in Figure 1, without transmitting the strain to the main circuit wires, as would happen in the usual installation, and will release the plug before any damage is done to the main circuit or it is deenergized by the blowing of a fuse. Moreover, it will be apparent that the main circuit need not be cut out in order to replace the drop cord, and if desired a previously made up replacement drop cord may be installed by any of the workmen without the necessity of the services of an electrician.

From the foregoing description, it will be apparent that the present invention provides improved means for removably connecting drop cords and the like into a wiring system; which embodies an arrangement of simple construction, economical to produce, and readily attachable to a fixture or outlet box; which will release a connection plug and enable it to be disconnected from an associated receptacle whenever abnormal pulling pressure is applied to the cord associated with the plug; and which enables the use of drop cords made up in standard units which can be installed by an ordinary workman without requiring the services of an electrician.

Now it is, of course, to be understood that although I have described in detail the preferred embodiment of my invention, the invention is not to be thus limited but only insofar as defined by the scope and spirit of the appended claim.

I claim as my invention:

In combination with the cover of an outlet box having a receptacle thereon, a plug connector for insertion in said receptacle, a J-shaped metallic member having its short leg seated on the cover and having its long leg adapted to extend over the plug to normally retain the plug against removal from the receptacle and being provided with an edge-opening slot for receiving wires connected with said plug, said long leg being of bendable metal, and means clampingly engaging said long leg at a point remote from the free end thereof, said means comprising a screw threaded in the outlet box and entered through said short leg and said long leg, respectively, and having a head compressively engaging said long leg.

WILLARD R. MATHENY.